US008156003B2

(12) United States Patent
Saitou et al.

(10) Patent No.: US 8,156,003 B2
(45) Date of Patent: Apr. 10, 2012

(54) APPARATUS, METHOD, AND PROGRAM FOR TRANSFERRING STRUCTURED DOCUMENTS INCLUDING PLURALITY OF DOCUMENT ELEMENTS

(75) Inventors: Daitoku Saitou, Yokohama (JP); Tetsuhiro Sumi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1577 days.

(21) Appl. No.: 11/126,117

(22) Filed: May 10, 2005

(65) Prior Publication Data
US 2006/0004908 A1    Jan. 5, 2006

(30) Foreign Application Priority Data
May 27, 2004   (JP) ................................ 2004-158203

(51) Int. Cl.
*G06F 15/16* (2006.01)
(52) U.S. Cl. ............... 705/14.49; 705/14.52; 705/14.59; 705/14.73; 709/201
(58) Field of Classification Search .................... 705/14, 705/10, 14.49, 14.52, 14.59, 14.73; 709/201
See application file for complete search history.

(56) References Cited

U.S. PATENT DOCUMENTS

| | | | | |
|---|---|---|---|---|
| 6,011,537 A | * | 1/2000 | Slotznick | 715/733 |
| 6,055,573 A | * | 4/2000 | Gardenswartz et al. | 709/224 |
| 6,298,330 B1 | * | 10/2001 | Gardenswartz et al. | 705/14.25 |
| 6,976,066 B1 | * | 12/2005 | Mouhanna et al. | 709/223 |
| 7,136,903 B1 | * | 11/2006 | Phillips et al. | 709/217 |
| 7,260,837 B2 | * | 8/2007 | Abraham et al. | 726/4 |
| 7,315,826 B1 | * | 1/2008 | Guheen et al. | 705/7 |
| 7,360,230 B1 | * | 4/2008 | Paz et al. | 725/47 |
| 7,555,559 B2 | * | 6/2009 | Chapweske | 709/232 |
| 2002/0002488 A1 | * | 1/2002 | Muyres et al. | 705/14 |
| 2002/0052925 A1 | * | 5/2002 | Kim et al. | 709/217 |
| 2002/0161637 A1 | * | 10/2002 | Sugaya | 705/14 |
| 2003/0018885 A1 | * | 1/2003 | Landsman et al. | 713/2 |

(Continued)

FOREIGN PATENT DOCUMENTS
JP          09325938          12/1997
(Continued)

OTHER PUBLICATIONS www.Wikipedia.org definitions for: data transfer rate, bit rate, device bandwidths, sliding window protocol, and common hybrid interface.*

(Continued)

*Primary Examiner* — James W Myhre
*Assistant Examiner* — Adam Chornesky
(74) *Attorney, Agent, or Firm* — The Brevetto Law Group

(57) ABSTRACT

A web browser 11 of a client 10 requests a transfer of a parent document having a banner advertisement and a news article included therein from a document processing module 21. Upon receiving their file names, a transfer rate determination module 24 instructs the document processing module 21 to check on a band and to stand by for transferring the news article. When the document processing module 21 completes the band check, the transfer rate determination module 24 calculates a transfer rate of the banner advertisement and a transfer rate of the news article and instructs the document processing module 21 to transfer the banner advertisement and the news article at the transfer rates. The transfer rates assure that the banner advertisement is displayed for a predetermined period of time before the news article is fully displayed.

12 Claims, 13 Drawing Sheets

U.S. PATENT DOCUMENTS

| | | | |
|---|---|---|---|
| 2003/0023488 A1* | 1/2003 | Landsman et al. | 705/14 |
| 2003/0028565 A1* | 2/2003 | Landsman et al. | 707/513 |
| 2003/0053475 A1* | 3/2003 | Veeraraghavan et al. | 370/431 |
| 2003/0078930 A1* | 4/2003 | Surcouf et al. | 707/10 |
| 2004/0225647 A1* | 11/2004 | Connelly et al. | 707/3 |
| 2005/0038900 A1* | 2/2005 | Krassner et al. | 709/231 |
| 2006/0004908 A1* | 1/2006 | Saitou et al. | 709/201 |
| 2006/0095472 A1* | 5/2006 | Krikorian et al. | 707/104.1 |
| 2006/0167784 A1* | 7/2006 | Hoffberg | 705/37 |
| 2006/0282319 A1* | 12/2006 | Maggio | 705/14 |
| 2007/0061487 A1* | 3/2007 | Moore et al. | 709/246 |

FOREIGN PATENT DOCUMENTS

| | | |
|---|---|---|
| JP | 09325938 A * | 12/1997 |
| JP | 11003072 | 1/1999 |
| WO | WO 0171591 | 3/2001 |

OTHER PUBLICATIONS

Applicant foreign reference (USPTO translations) for WO 01/07159, JP11003072A.*

* cited by examiner

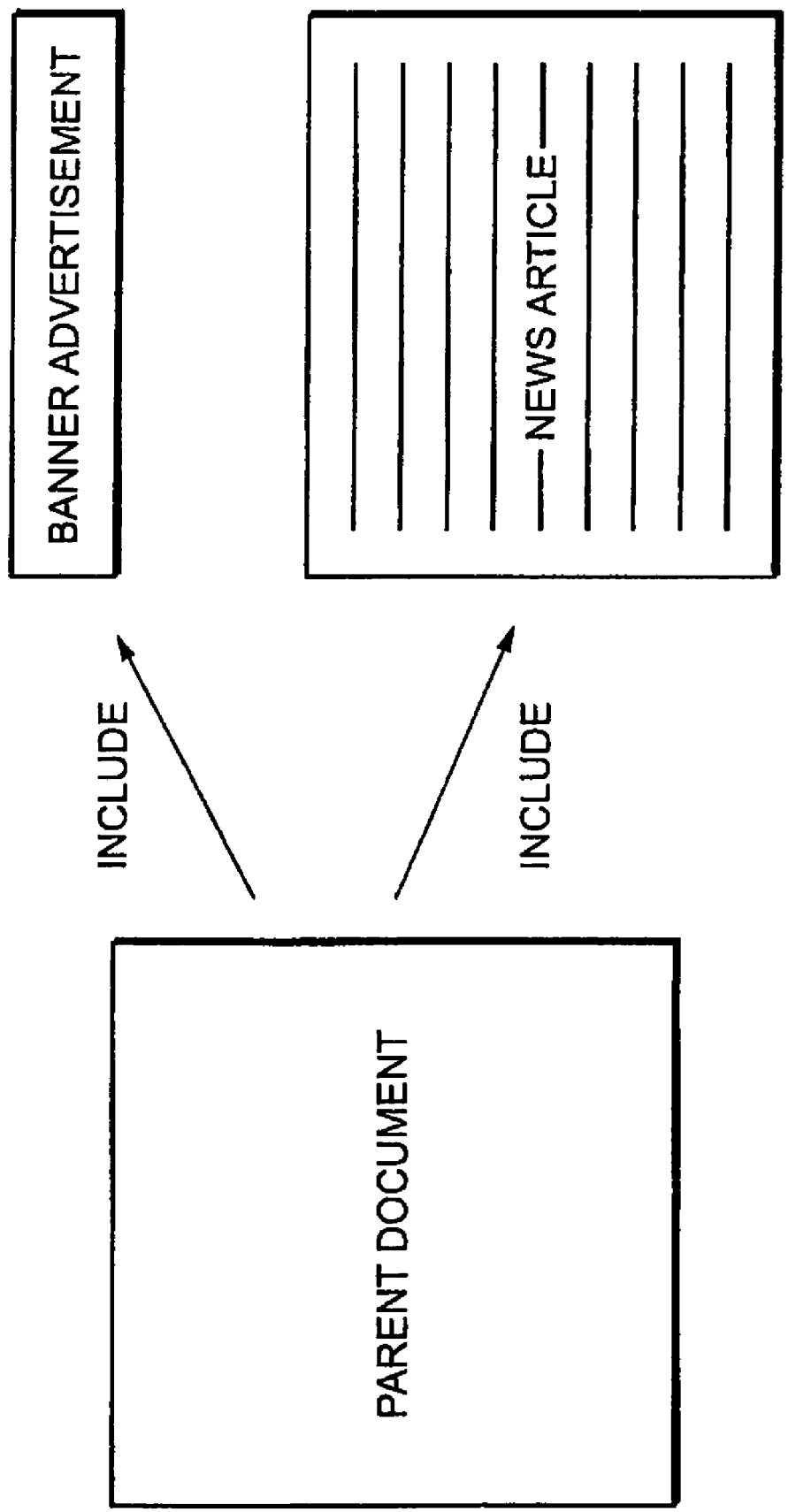

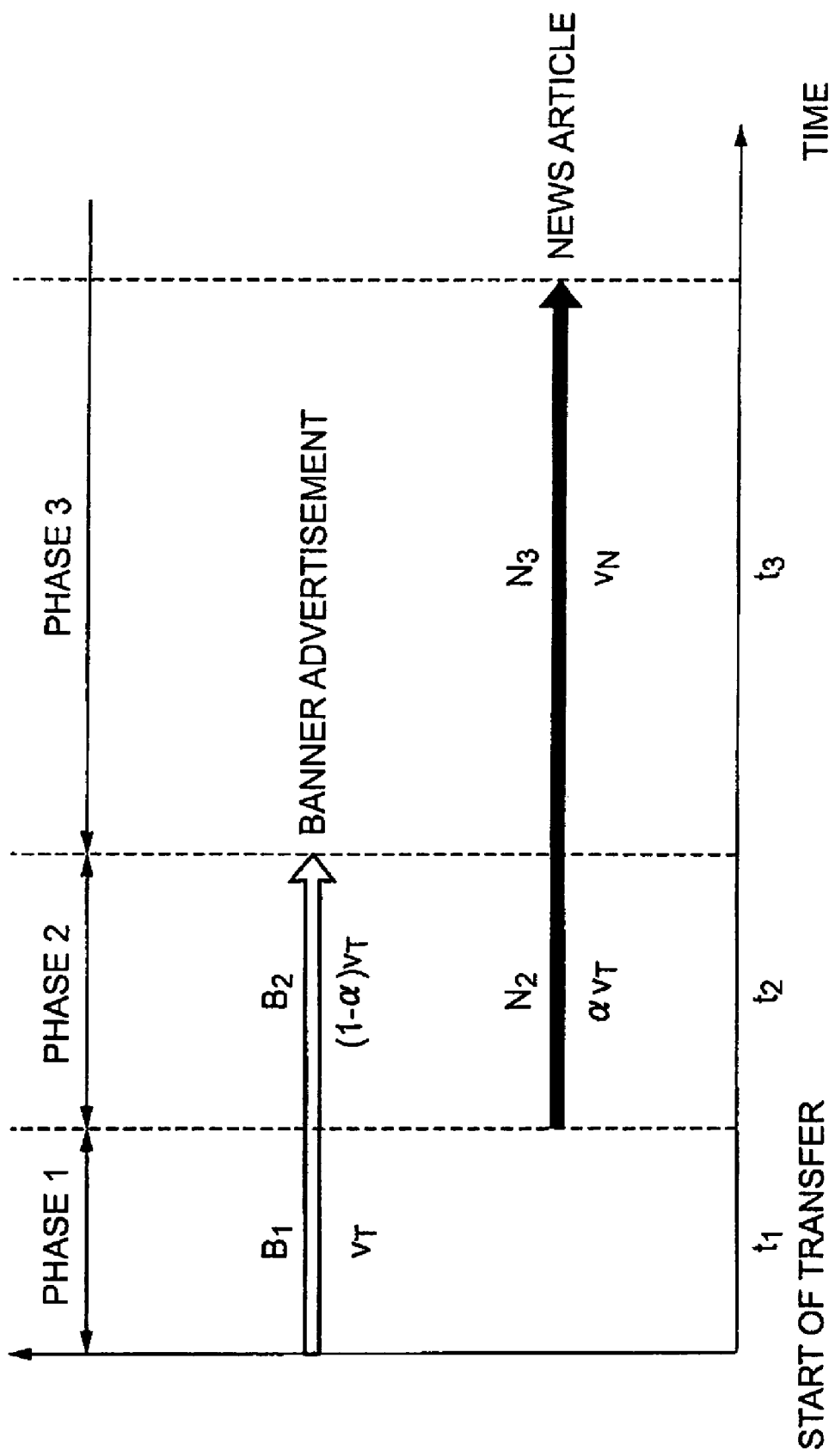

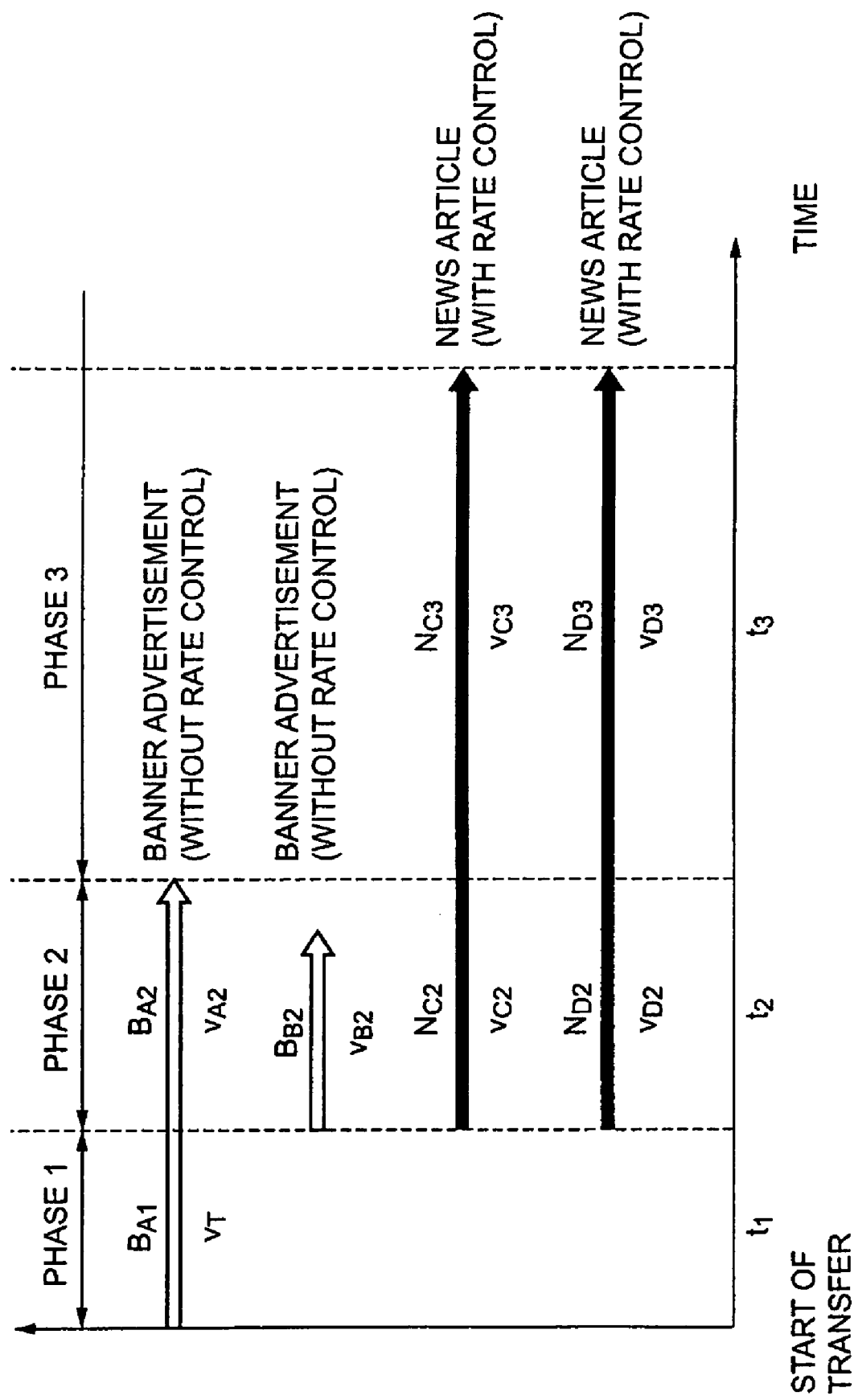

APPARATUS, METHOD, AND PROGRAM FOR TRANSFERRING STRUCTURED DOCUMENTS INCLUDING PLURALITY OF DOCUMENT ELEMENTS

TECHNICAL FIELD

The present invention relates to a technology for controlling transfer rates of at least a first and a second document element constituting a structured document such as an HTML document when transferring the document elements by a communication line from a server computer (hereinafter, referred to as "server") to a client computer (hereinafter, referred to as "client").

DESCRIPTION OF RELATED ART

Conventionally, television, radio, newspaper, magazine and other media have been the main carriers of advertisings. In recent years, however, a lot of people have come to use web sites as an advertising medium due to a development of the Internet. When a web site is used as an advertising medium, generally advertisement charges are paid to an operator of the site based on a fixed standard such as the number of clicks on the advertisement. This motivates the operator of the site to make efforts to get as many users as possible to view the advertisement on the site.

On the other hand, a user visiting the web site is interested in information that should be originally provided on the web site, not being interested in an advertisement on the web page.

For example, a user visiting a news site on the Internet wants to read news articles, but not wanting to see the advertisement on the news site. On the other hand, there are circumstances that the operator of the news site wants the user to notice the advertisement on the news site, too.

Therefore, conventionally it has been considered how an advertisement can be emphasized when using a web site to deliver the advertisement and thereby various advertisement forms have been conceived.

One of these forms is a popup advertisement. The popup advertisement is a new window opened for the advertisement, which is other than a window for displaying a web page including information that should be originally provided. Admittedly, this advertisement form has a certain advertising effect since the process of opening the new window attracts a user's attention. A user, however, who does not want to see the advertisement needs to close the new window. It is therefore low in user satisfaction. The user satisfaction is so low that "a blocking tool" for inhibiting a display of a popup advertisement has been developed.

Another advertisement form is a banner advertisement. The banner advertisement is pasted to a specific portion on a web page including information that should be originally provided. By clicking the banner advertisement, a user can jump to the site of the advertiser of the banner advertisement. This advertisement form does not require a special operation such as closing the new window opened for the advertisement and thus does not decrease the user satisfaction extremely. It, however, enables the user to view the information that should be originally provided on the web site without viewing the banner advertisement, by which its advertising effect is reduced.

Therefore, there have been considered advertisement methods for improving a certain advertising effect without making a user uncomfortable (See International Publication No. 01/071591 (the sixth embodiment), for example).

The invention in the patent document 1 is to adjust download speeds of a Commercial Message (CM) file and target data so that the download of the target data terminates simultaneously with or after the end of reproduction of the CM file. In this regard, the invention in the patent document 1 assumes that the CM file is distributed in a streaming procedure. Therefore, it means that the download speeds are adjusted so that the download of the target data terminates simultaneously with or after the end of the download of the CM file. In other words, the patent document 1 does not include an adjustment of a download end time of the target data in order to show the CM file for a certain period of time after downloading the CM file.

Therefore, the invention in the patent document 1 has a problem of being incapable of making adjustments for showing information having been downloaded and all been displayed to a user for a certain period of time.

SUMMARY OF THE INVENTION

The present invention addresses the above technical problem. Therefore, it is an object of the present invention to enable making adjustments for showing information having been downloaded and completely displayed to a user for a certain period of time.

It is another object of the present invention to prevent the user from being aware of the adjustments without a timeout.

It is still another object of the present invention to enable making the adjustments in a best effort type network typified by the TCP/IP.

In view of these objects, the present invention provides a server (a first computer) control for securing a certain period of time or longer as a period of time from a completion of transferring a first document element (for example, banner advertising) required to attract user's attention on the client (a second computer) side to a completion of transferring a second document element (for example, a news article) as the remaining document element. Even before a completion of a transfer of the entire structured document such as a HTML document, the current typical browser makes a request for a transfer of a document element such as an image file included in the document concurrently, and transferred document elements are displayed sequentially. The present invention utilizes the feature of the browser on the client side to bring the transferred document element to user's attention inevitably by decreasing the transfer rate on the server side after a completion of transferring the document element to be emphasized until the remaining document element is transferred. More specifically, an apparatus according to the present invention is for use in transferring a structured document including at least a first and a second document elements for a display on a client via a communication line and comprises means for receiving a request to send the structured document from the user, a memory for storing a predetermined period of time (a specific period of time) for displaying only the first document element on the client before displaying the entire structured document, and means for determining a first transfer rate of the first document element and a second transfer rate of the second document element so that a period of time from a completion of transferring the first document element to a completion of transferring the remaining document element (the second document element) is equal to or longer than the specific period of time.

Furthermore, the present invention can also be understood as a method of transferring a structured document. If so, the method of the present invention is understood as a method of transferring a structured document including at least a first and a second document elements from a first computer to a second computer via a communication line. Specifically, the method comprises the steps of: the first computer causing a predetermined period of time (a specific period of time) to elapse for displaying only a first document element on the second computer before displaying the entire structured document to be stored into a memory; receiving a request to send the structured document from the second computer; the first computer acquiring amounts of data of the first document element and the remaining document element (a second document element); the first computer checking on a communication band in the communication line; the first computer distributing the communication band in proportions calculated on the basis of the communication band, the specific period of time, and the amounts of data of the acquired first and second document elements, thereby determining a first transfer rate of the first document element and a second transfer rate of the second document element so that a period of time from a completion of transferring the first document element to a completion of transferring the second document element is equal to or longer than the specific period of time; and the first computer transferring the first document element and the second document element to the second computer at the determined first and second transfer rates.

On the other hand, the present invention can also be understood as a program for causing a computer to execute the above method.

According to the present invention, it becomes possible to make adjustments for showing information having been downloaded and fully displayed to a user for a certain period of time.

BRIEF DESCRIPTION OF THE DRAWINGS

FIG. 3 is a diagram showing a configuration of a structured document treated in the embodiment of the present invention.

FIG. 5 is a diagram for explaining a theory of a decelerated transfer in the embodiment of the present invention.

FIG. 13 is a diagram for explaining a theory of a decelerated transfer where there are a plurality of banner advertisements and news articles in the embodiment of the present invention.

DETAILED DESCRIPTION OF THE PREFERRED EMBODIMENT

The preferred embodiment of the present invention (hereinafter, referred to as "embodiment") will now be described in detail hereinafter with reference to the accompanying drawings.

Figure 1:
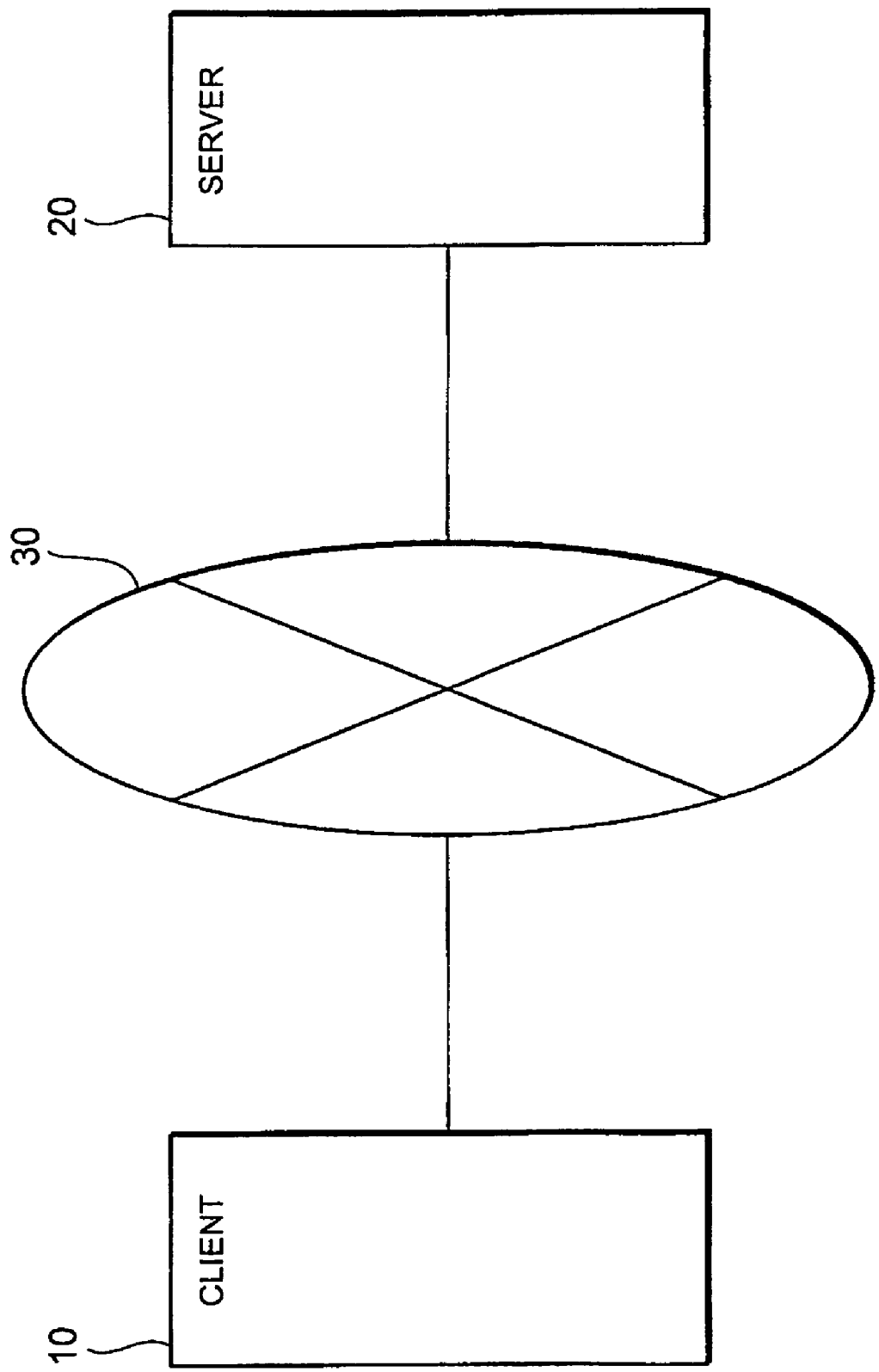
FIG. 1 is a diagram showing an entire configuration of a client/server system to which an embodiment of the present invention is applied.

As shown in FIG. 1, a client 10 is connected to a server 20 via a network 30 in this embodiment.

The client 10 is an information processor such as a personal computer (PC), personal digital assistants (PDA), or a mobile phone, which a user uses.

The server 20 stores a structured document described, for example, in a hypertext markup language (HTML) and transmits this structured document via the network 30 in response to a request from the client 10.

The network 30 can be, for example, the Internet.

Figure 2:
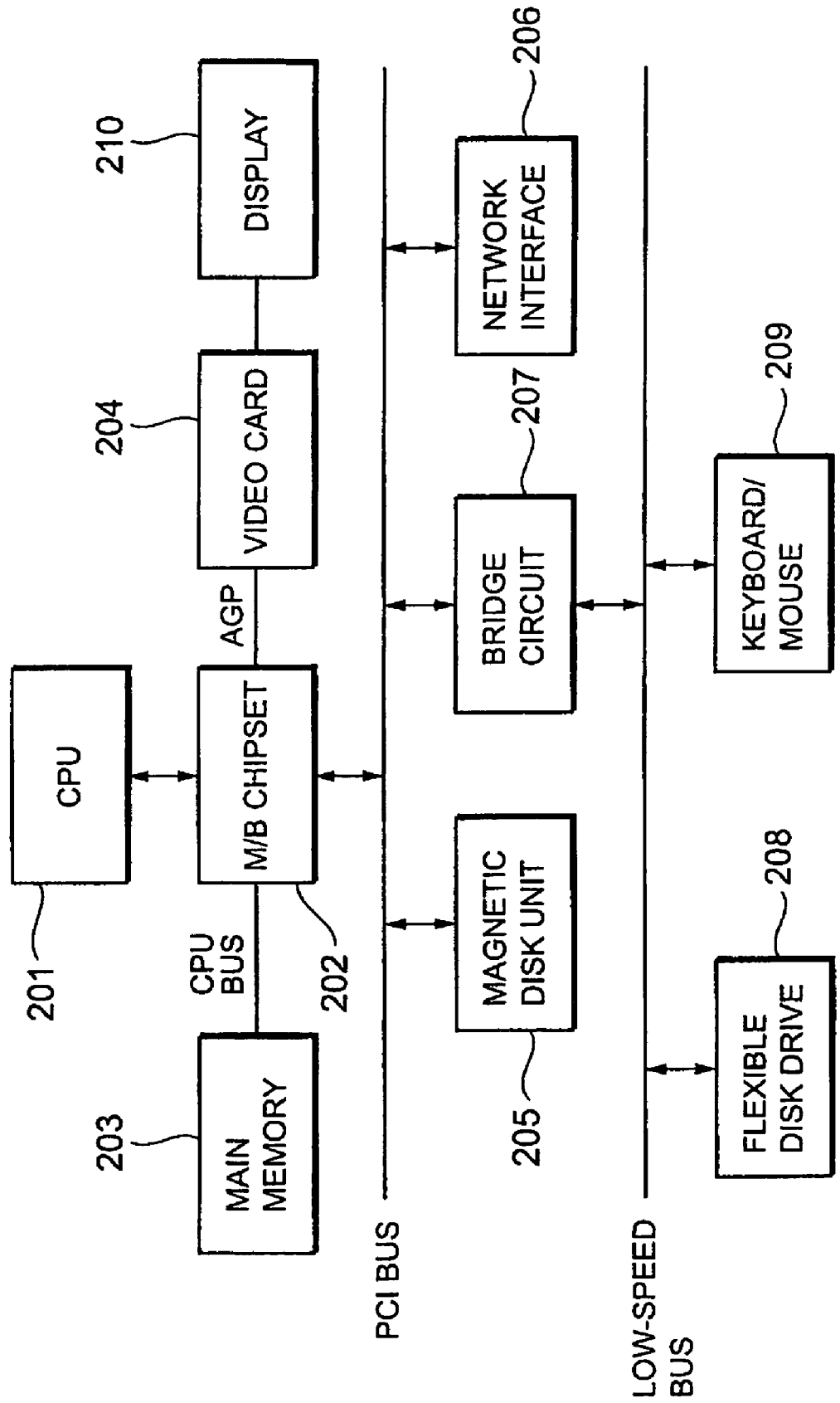
FIG. 2 is a block diagram showing a hardware configuration of the server according to the embodiment of the present invention.

Referring to FIG. 2, there is shown a diagram schematically illustrating an example of a hardware configuration of a computer preferably used as the server 20 in this embodiment.

The computer shown in FIG. 2 comprises a central processing unit (CPU) 201 as an arithmetic means, a main memory 203 connected to the CPU 201 via a motherboard (M/B) chipset 202 and a CPU bus, a video card 204 and a display 210 connected to the CPU 201 via the M/B chipset 202 again and an accelerated graphics port (AGP), a magnetic disk unit (HDD) 205 and a network interface 206 connected to the M/B chipset 202 via a peripheral component interconnect (PCI) bus, and a flexible disk drive 208 and a keyboard/mouse 209 connected to the M/B chipset 202 via a bridge circuit 207 and a low-speed bus such as an industry standard architecture (ISA) from the PCI bus.

FIG. 2 only illustrates the hardware configuration of the computer for carrying the embodiment into effect, and any other various configurations can be adopted only if the embodiment can be applied thereto. For example, it is possible to mount only a video memory instead of providing the video card 204, by which the CPU 201 processes image data. It is also possible to provide a drive such as a compact disc recordable (CD-R) or a digital versatile disc random access memory (DVD-RAM) via an interface such as an AT attachment (ATA) or a small computer system interface (SCSI) as an external storage device.

Figure 4A:
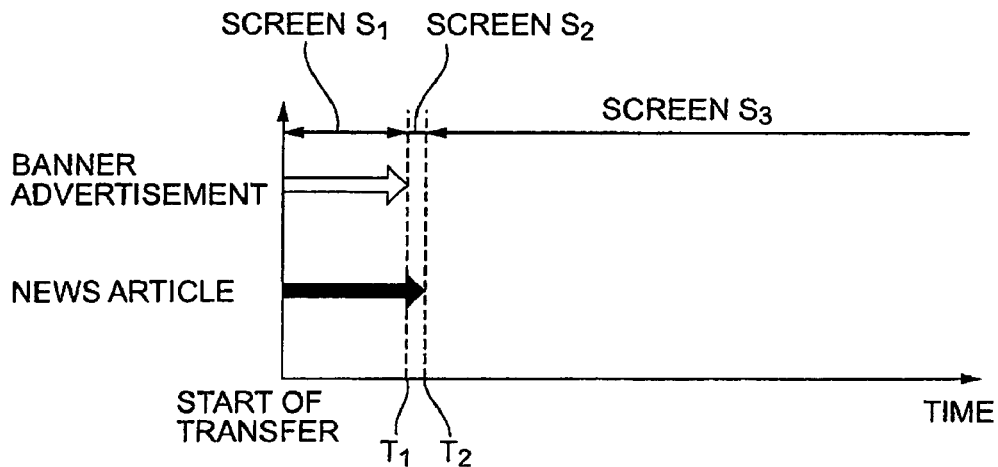
FIG. 4 is a diagram for explaining a situation of transferring a banner advertisement and a news article in the embodiment of the present invention in comparison with a conventional technology.
Figure 4B:
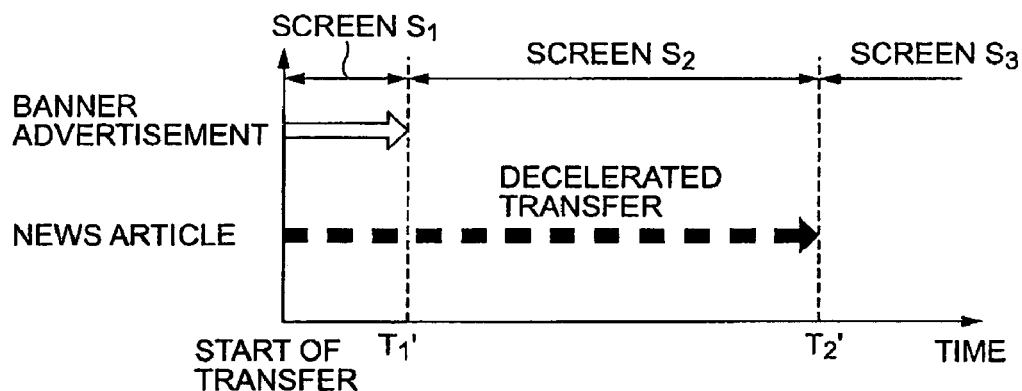
Figure 4C:
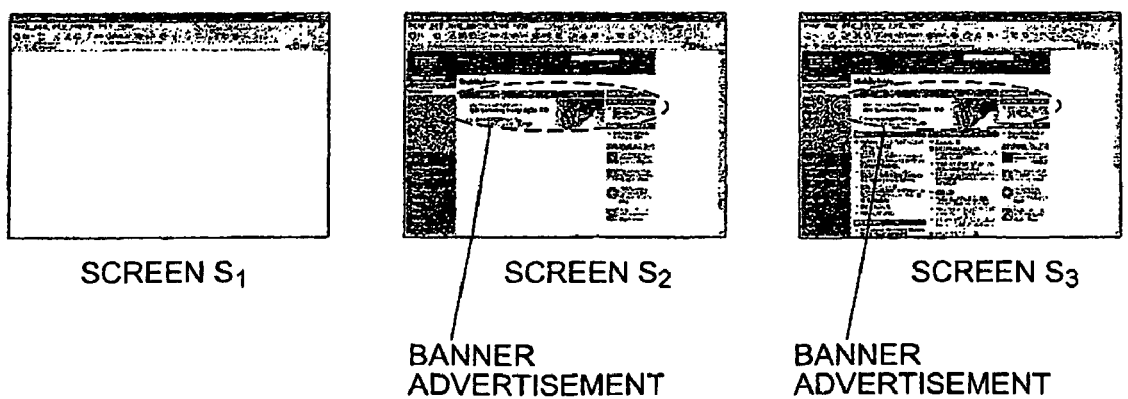

The following describes a basic principle of this embodiment with reference to FIGS. 3 and 4.

This embodiment will be described assuming that a banner advertisement is the first document element and a news article is the second document element, as those constituting a structured document. In other words, as shown in FIG. 3, it is assumed that a parent document includes the banner advertisement and the news article.

A transfer of the structured document has conventionally been performed as shown in FIG. 4(a). In other words, both the banner advertisement and the news article are transferred at the same transfer rate initially and only the parent document is displayed until time $T_1$ as indicated by screen $S_1$. Subsequently, only the banner advertisement is displayed as indicated by screen $S_2$ from a completion of transferring the banner advertisement at the time $T_1$ to a completion of transferring the news article at time $T_2$. After the time $T_2$, the banner advertisement and the news article are displayed as indicated by screen $S_3$.

On the other hand, according to this embodiment, the transfer of the structured document is performed as shown in FIG. 4(b). In other words, only the parent document is displayed as indicated by screen $S_1$ until time $T_1'$. Subsequently, only the banner advertisement is displayed as indicated by screen $S_2$ from a completion of transferring the banner advertisement at the time $T_1'$ to a completion of transferring the news article at time $T_2'$. In this embodiment, the news article is transferred at a decreased transfer rate from the time $T_1'$ to the time $T_2'$, by which the display condition can be maintained for a certain period of time. After the time $T_2'$, the banner advertisement and the news article are displayed as indicated by screen $S_3$.

Subsequently, a theory of the decelerated transfer will be described with reference to FIG. 5.

The following points are assumed to be prerequisites of the decelerated transfer:

A communication band between the client 10 and the server 20 is equal to the total of all connection speeds.

A speed of transferring data from the server 20 to the client 10 can be controlled to an arbitrary speed within the communication band (for example, a rate control by increasing or decreasing a window size in the TCP).

The server 20 presets a period of time $t_3$ during which the user views only the banner advertisement.

The theory will be described below under these prerequisite conditions.

A transfer procedure in this embodiment comprises phases 1 to 3 and therefore is described for individual phases with reference to FIG. 5. FIG. 5 shows a situation of transferring the banner advertisement and the news article, where a horizontal axis is a time axis. A symbol over each arrow indicates an amount of transferred data of the banner advertisement or the news article in the corresponding phase and a symbol under each arrow indicates a transfer rate of the banner advertisement or the news article in the corresponding phase. Furthermore, B is an amount of data of the banner advertisement and N is an amount of data of the news article, though they are not shown in FIG. 5.

The phase 1 is described first.

In phase 1, the communication band between the client 10 and the server 20 is checked on. A part (amount of data $B_1$) of the banner advertisement is used to check on the communication band $v_T$. This phase, however, is unnecessary for a network for mobile phones or a network whose band is fixed without having a dynamic flow control function. If this type of network is used, 0 is taken for $B_1$ ($B_1=0$) and the communication band $v_T$ is assumed to be the fixed communication band, and then the control progresses to the phase 2.

On the other hand, for a best effort type network having no band guarantee typified by the TCP/IP, there is no way of learning a band at an end of the network. Therefore, the band between the client 10 and the server 20 is checked on by transferring a part of the banner advertisement or by transferring the banner advertisement for a certain period of time. Specifically, only the banner advertisement is transferred at the maximum transfer rate to check on the communication band.

Figure 6:
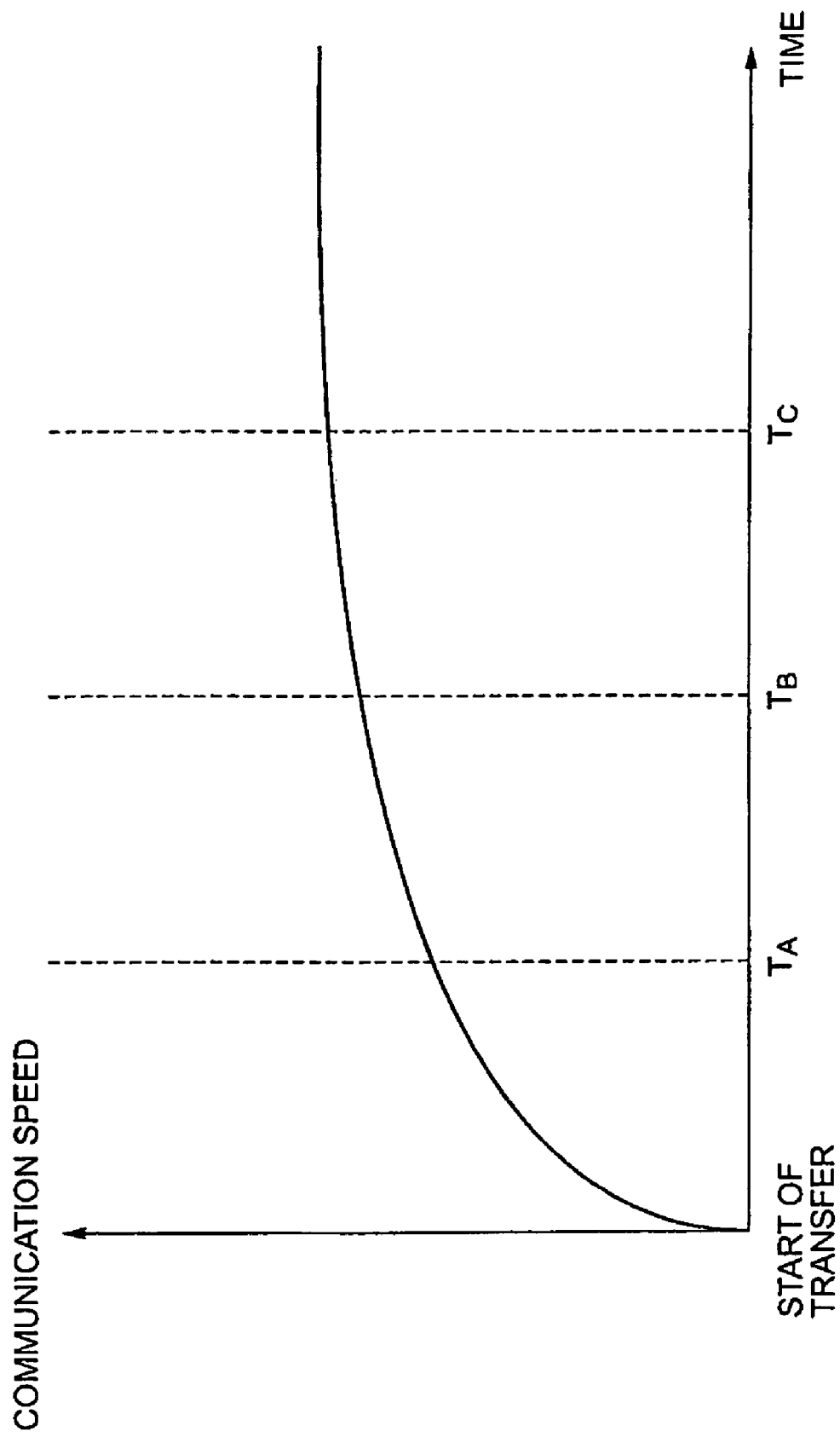
FIG. 6 is a diagram for explaining a timing of a band check in the embodiment of the present invention.

For example, the following discusses checking on a transfer rate in a protocol in which the transfer starts at a low speed (slow start) and the transfer speed increases gradually and reaches the maximum speed, like a TCP sliding window procedure shown in FIG. 6. In this condition, the transfer rate acquired at time $T_A$ is inaccurate. For acquiring an accurate transfer rate, there is a method of adopting a value in a steady state, in which the acceleration is stopped, by checking the transfer rate regularly. For example, a value between time $T_B$ and time $T_C$ is adopted. There is also a method of observing an increase or decrease in a window size and considering a steady state at an occurrence of the decrease in the window size by utilizing a mechanism that the window size increases during acceleration. In this manner, a communication amount and an accuracy of the band check depend upon a communication protocol and existing technologies can be used for the band check. Therefore, their detailed description is omitted in this specification.

Next, the phase 2 is described below.

In the phase 2, a transfer is performed by giving the banner advertisement priority. More specifically, transfer rates of the banner advertisement and the news article are determined by using the communication band obtained in the phase 1 and they are transferred at the transfer rates. In distributing the communication band to the banner advertisement and the news article, a ratio of the banner advertisement to the news article is assumed to be $(1-\alpha)$ to $\alpha$ ($0<\alpha<1$). In addition, the transfer rate allocation is determined so that the news article can be transferred at the same speed in the phase 2 and the phase 3 and so that the length of the phase 3 is equal to $t_3$ previously specified by the server 20.

All variables in the right-hand side are already known and therefore $\alpha$ satisfying the conditions is determined by this equation.

The conditions described herein above are represented by the following:

$$\alpha v_T = N_3/t_3$$

$$N_3 = N - N_2$$

$$N_2 = \alpha v_T t_2$$

$$t_2 = B_2/(1-\alpha)v_T$$

If we find out $\alpha$ from these equations, we have:

$$\alpha = v_T t_3 + N + B_2 \pm \sqrt{(v_T t_3 + N + B_2)^2 - 4 v_T t_3 N}/2 v_T t_3 \, (0 < \alpha < 1)$$

Consequently, the transfer rate of the banner advertisement is $(1-\alpha)v_T$ and the transfer rate of the news article is $\alpha v_T$. In this regard, the transfer rate $(1-\alpha)v_T$ of the banner advertisement is consistently an estimated value and therefore no adjustment is made to this transfer rate, but a control is made to achieve $\alpha v_T$ as the transfer rate of the news article.

Subsequently, the phase 3 is described below.

In the phase 3, the news article is transferred at a decreased transfer rate. Specifically, in the phase 3, a remaining part of the news article is transferred after the completion of transferring the banner advertisement. There are two methods for this transfer: a method 1 without readjustment of the transfer rate and a method 2 with readjustment of the transfer rate using the information up to the phase 2.

The method 1 is to continue the transfer of the news article without any change in $\alpha v_T$ which is the transfer rate determined in the phase 2.

On the other hand, the method 2 is to determine a new transfer rate $v_N$ of the news article by the following equation using a news article $N_3$ not transferred yet at that time and the specified time $t_3$, to make a control to achieve the transfer rate, and to continue the transfer of the news article.

$$v_N = N_3/t_3$$

The method 1 has an advantage that the transfer rate need be set only once and the method 2 has an advantage that the accuracy of $t_3$ increases.

The following describes a system configured by using a theory of the decelerated transfer described hereinabove.

Figure 7:
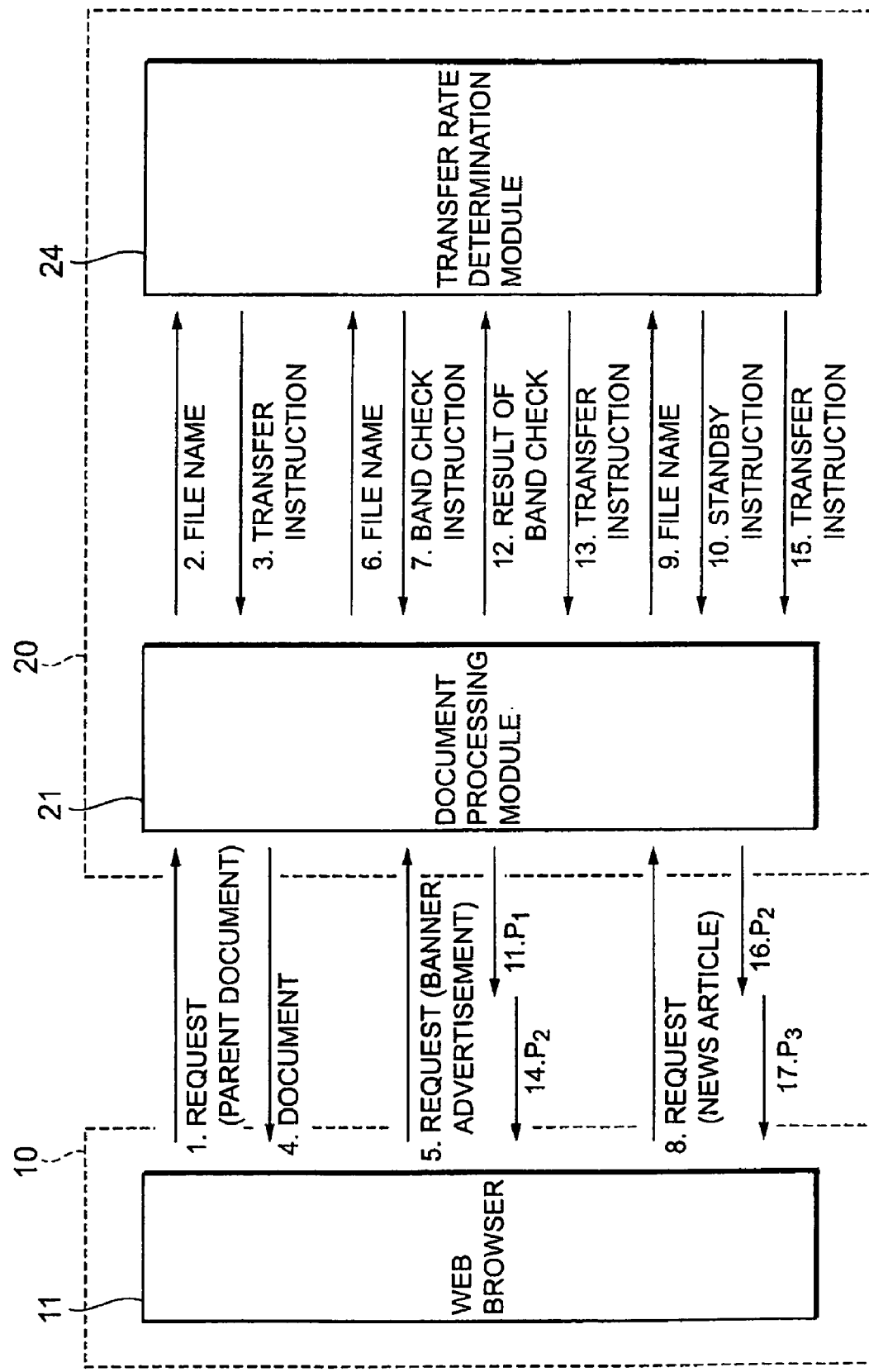
FIG. 7 is a diagram showing a module configuration of a one-to-one correspondence between the client and the server in the embodiment of the present invention.

As shown in FIG. 7, in this system, a web browser 11 operates in the client 10 and a document processing module 21 and a transfer rate determination module 24 operate in the server 20.

The document processing module 21 is for use in reading out the parent document, the banner advertisement, and the news article specified by the client 10 and transferring them to the web browser 11. In this system, the transfer rate determination module 24 is added to the document processing module 21.

The transfer rate determination module 24 is for use in associating connections with each other by using an existing technology such as cookies to connect stateless requests and exchanging a file size, a communication band, an adjusted transfer rate, or the like between processing modules for adjustment.

An outline of the operation in this system is described below.

First, the web browser 11 transmits a request of acquiring the parent document to the document processing module 21 (1. Request). In response to the request, the document processing module 21 sends the requested file name to the transfer rate determination module 24 (2. File name).

In response to this, the transfer rate determination module 24 instructs the document processing module 21 to transfer a file specified by the file name (parent document) (3. Transfer instruction). According to this instruction, the document processing module 21 transmits the parent document to the web browser 11 (4. Document).

Upon receiving the parent document, the web browser 11 finds a banner advertisement and a news article included in the parent document. Therefore, it then transmits a request of acquiring the banner advertisement to the document processing module 21 (5. Request) and transmits a request of acquiring the news article thereto (8. Request). In response to these requests, the document processing module 21 sends file names of the requested banner advertisement and news article to the transfer rate determination module 24 (6. File name, 9. File name).

In response to this, the transfer rate determination module 24 instructs the document processing module 21 to check on the band (7. Band check instruction) and to stand by for transferring the news article (10. Standby instruction).

In response to these instructions, the document processing module 21 checks on the band by using a part of the banner advertisement (11. $P_1$) and returns a result thereof to the transfer rate determination module 24 (12. Result of band check). This causes the transfer rate determination module 24 to determine the transfer rate of the banner advertisement and the transfer rate of the news article according to the theory of the decelerated transfer described above. The transfer rate determination module 24 then instructs the document processing module 21 to transfer the banner advertisement at the determined transfer rate (13. Transfer instruction). In addition, it instructs the document processing module 21 to transfer the news article at the determined transfer rate (15. Transfer instruction).

In response to these instructions, the document processing module 21 transfers the remaining part of the banner advertisement (14. $P_2$) and the news article (16. $P_2$). Thereafter, the document processing module 21 continues the transfer of the news article at the same transfer rate or at the readjusted transfer rate (17. $P_3$). ($P_1$, $P_2$, and $P_3$ indicate data transfers in the phase 1, the phase 2, and the phase 3, respectively.)

Figure 8:
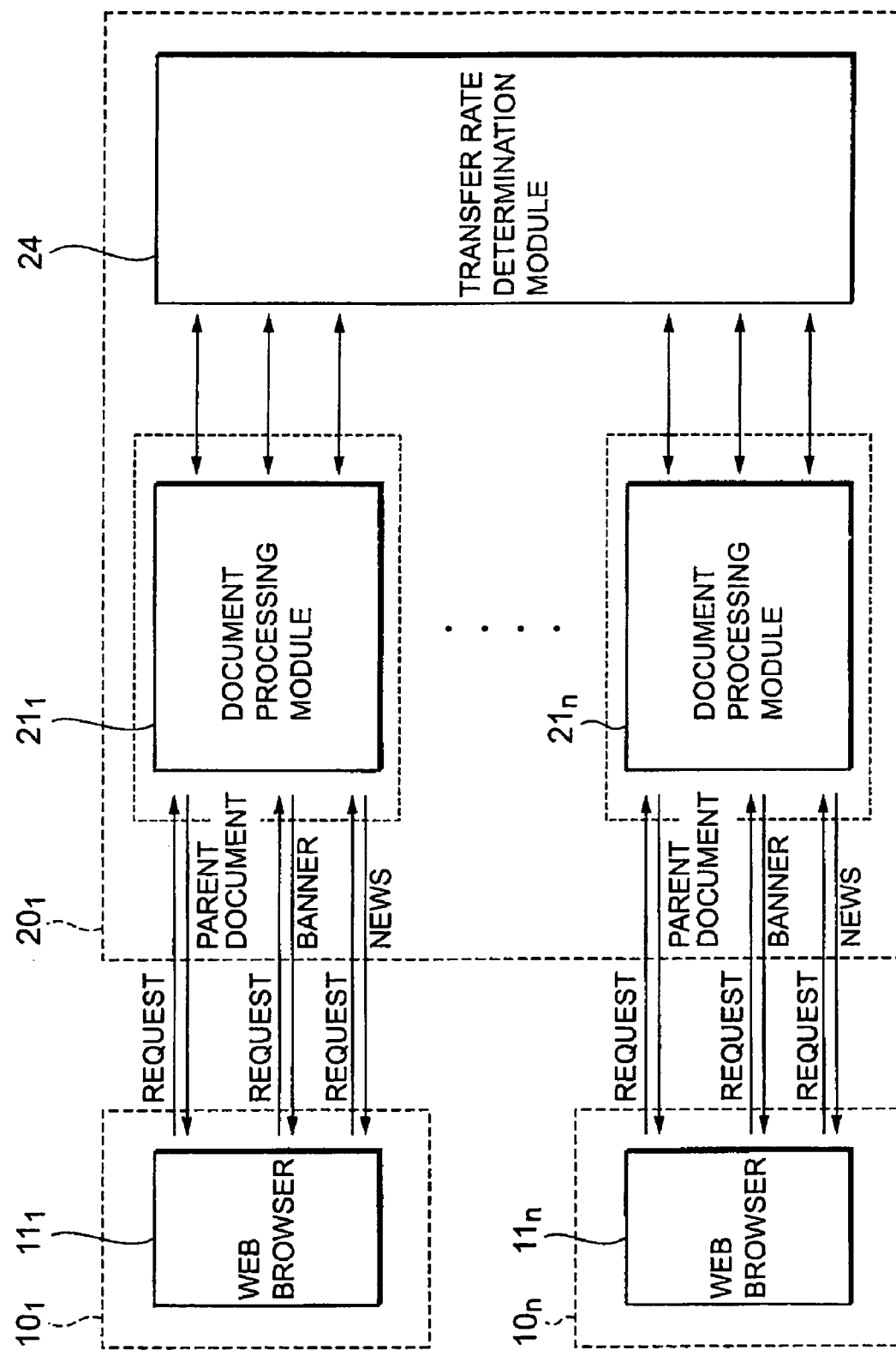
FIG. 8 is a diagram showing a module configuration of an n-to-one correspondence between the client and the server in the embodiment of the present invention.

While FIG. 7 shows the configuration of a one-to-one correspondence between the client 10 and the server 20, it is generally expected that a single server 20 receives requests from a plurality of clients $10_1$ to $10n$ at a time. FIG. 8 shows a mechanism of linking modules not related to each other through the transfer rate determination module 24 in this condition.

Respective information on the parent document, the banner advertisement, and the news article processed by the document processing module $21k$ according to requests from the web browser $11k$ (k=1 to n) are associated with each other by using an existing technology such as cookies in the transfer rate determination module 24. Thereby, for each web browser 11, information requested from any other web browser 11 is not displayed, but only information requested by the corresponding web browser 11 is displayed.

An example of the configuration of the transfer rate determination module 24 will now be described in detail below.

Figure 9:
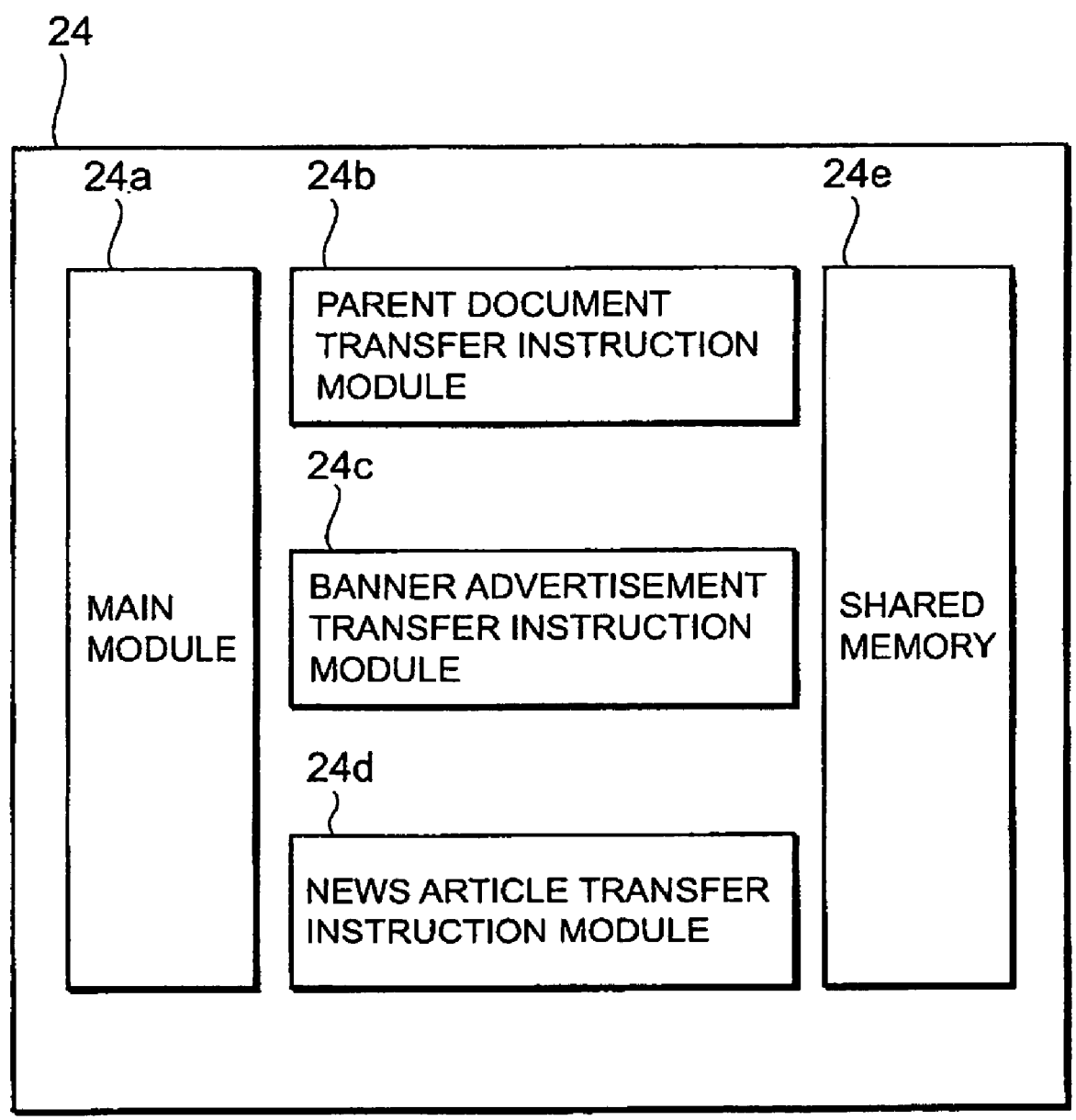
FIG. 9 is a diagram showing an example of a further detailed configuration of a transfer rate determination module in the embodiment of the present invention.

As shown in FIG. 9, the transfer rate determination module 24 includes a main module 24a, a parent document transfer instruction module 24b, a banner advertisement transfer instruction module 24c, a news article transfer instruction module 24d, and a shared memory 24e.

The following describes an operation of the transfer rate determination module 24 having the above configuration.

In the transfer rate determination module 24, the main module 24a receives a file name from the document processing module 21, first. If the received file name is a file name of the parent document, the parent document transfer instruction module 24b is operated. If it is a file name of the banner advertisement, the banner advertisement transfer instruction module 24c is operated. If it is a file name of the news article, the news article transfer instruction module 24d is operated.

Upon receiving the file name from the main module 24a, the parent document transfer instruction module 24b instructs the document processing module 21 to transfer a file of the file name, though it is not shown.

Figure 10:
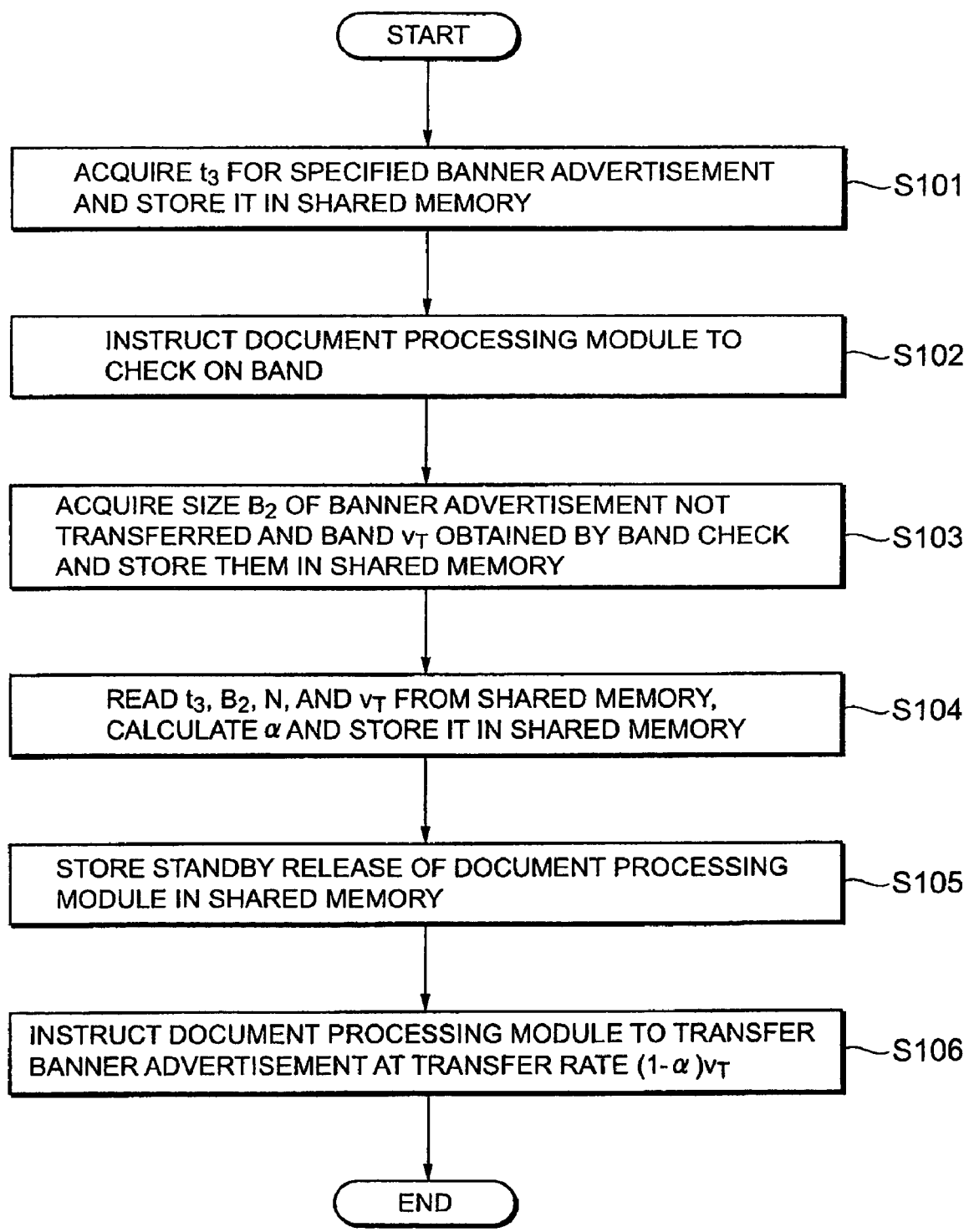
FIG. 10 is a flowchart showing an example of an operation of a banner advertisement transfer instruction module in the embodiment of the present invention.

Upon receiving the file name from the main module 24a, the banner advertisement transfer instruction module 24c operates as shown in FIG. 10.

Specifically, the banner advertisement transfer instruction module 24c first acquires $t_3$ for the specified banner advertisement and stores it into the shared memory 24e (step 101). The value $t_3$ is determined by the duration in which an advertiser of the banner advertisement wants to show a user the banner advertisement. Therefore, it may vary with an advertiser or type of the banner advertisement or the like. Thus, for example, a storage device may previously store a correspondence between the file name of the banner advertisement and $t_3$, which is a period of time for which the advertisement wants to show the banner advertisement, so as to acquire $t_3$ corresponding to the specified banner advertisement. Naturally, $t_3$ uniformly determined by the server 20 can also be used.

Subsequently, the banner advertisement transfer instruction module 24c instructs the document processing module 21 to check on the band (step 102).

Thereafter, the document processing module 21 that has completed the band check transmits the size $B_2$ of the banner advertisement not transferred yet and the band $v_T$ acquired as a result of the check to the banner advertisement transfer instruction module 24c. Therefore, the banner advertisement transfer instruction module 24c acquires and stores them into the shared memory 24e (step 103).

At this point of time, the shared memory 24e stores $t_3$, $B_2$, and $v_T$. It is further to store a file size N of the news article as a result of processing of the news article transfer instruction module 24d described later. Thereby, the banner advertisement transfer instruction module 24c reads out these values from the shared memory 24e and applies them to the variables in the equation 5 to obtain α. It then stores it in the shared memory 24e (step 104).

During this time, the news article transfer instruction module 24d has just instructed the document processing module 21 to stand by and is awaiting an instruction to release the standby condition as described later. Therefore, the banner advertisement transfer instruction module 24c stores the instruction to release the standby condition of the document processing module 21 into the shared memory 24e (step 105).

Thereafter, the banner advertisement transfer instruction module 24c instructs the document processing module 21 to transfer the banner advertisement at the transfer rate $(1-\alpha)v_T$ (step 106).

Figure 11:
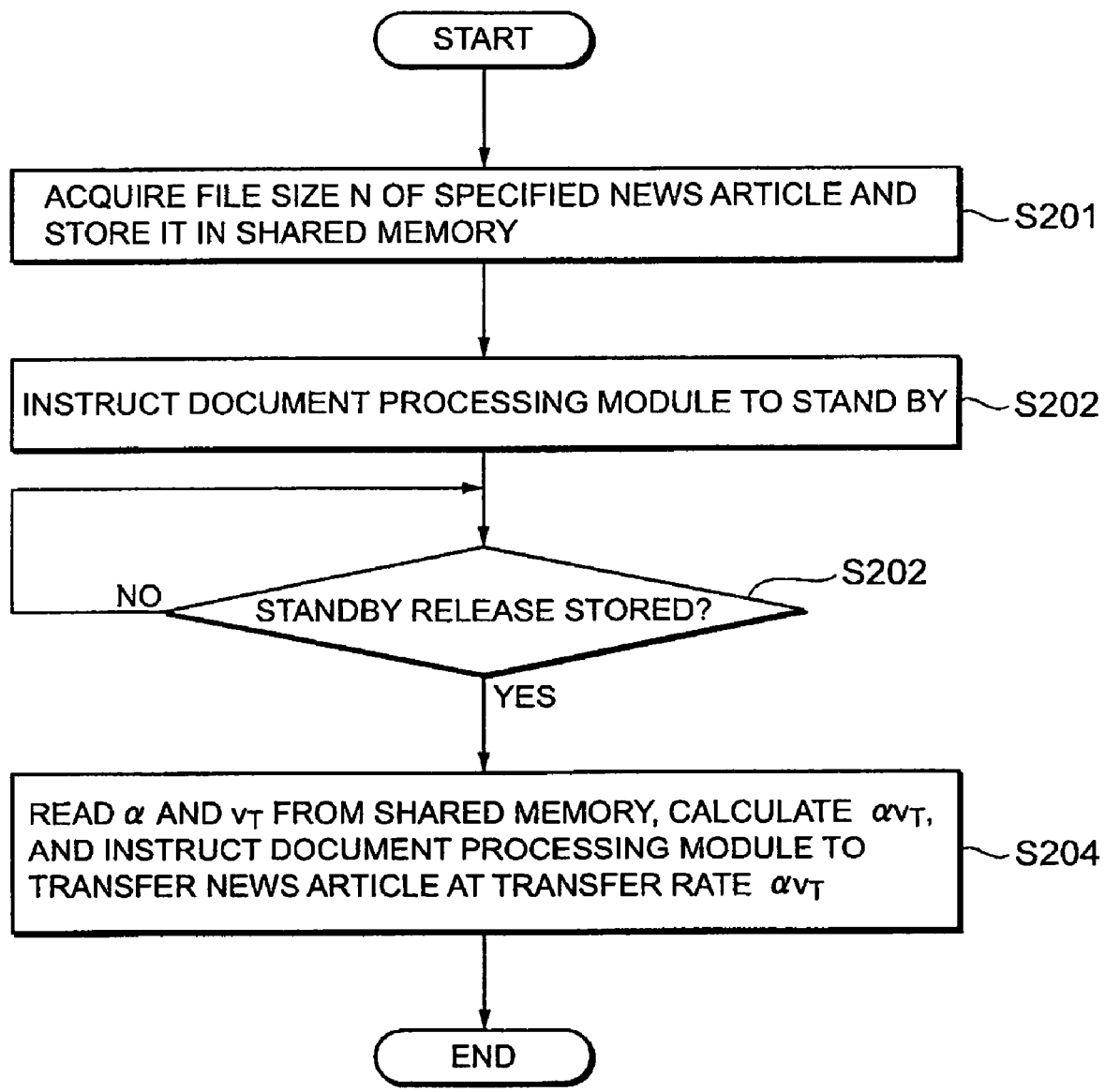
FIG. 11 is a flowchart showing an example of an operation of a news article transfer instruction module in the embodiment of the present invention.

On the other hand, the news article transfer instruction module 24d performs the operation as shown in FIG. 11, upon receiving the file name from the main module 24a.

Specifically, the news article transfer instruction module 24d first acquires the file size N of the specified news article and stores it into the shared memory 24e (step 201). It then instructs the document module 21 to stand by (step 202). Subsequently, the news article transfer instruction module 24d determines whether or not the shared memory 24e has the standby release instruction (step 203). Unless it has the standby release instruction as a result of the determination, the step 203 is repeated. If it has the standby release instruction, the news article transfer instruction module 24d reads out α and $v_T$ from the shared memory 24e, calculates $\alpha v_T$, and instructs the document processing module 21 to transfer the news article at the transfer rate (step 204).

While the banner advertisement transfer instruction module 24c calculates α from $t_3$, $B_2$, N, and $v_T$ in the above operation, the news article transfer instruction module 24d may calculate α or another module may calculate it by preparing the module as a dedicated one for the α calculation.

Furthermore, the transfer rate determination module 24 having the configuration shown in FIG. 9 may readjust the transfer rate of the news article at the completion of transferring the banner advertisement. If so, for example, the following processing is performed. Specifically, the document processing module 21 informs the main module 24a of the completion of transferring the banner advertisement and the main module 24a then informs the news article transfer instruction module 24d of the completion. Thereby, the news article transfer instruction module 24d checks on the size $N_3$ of the news article not transferred yet, reads out $t_3$ from the shared memory 24e, and obtains a new transfer rate $v_N$ of the news article. It then instructs the document processing module 21 to transfer the news article at the transfer rate.

Furthermore, in the above description, as shown in FIG. 7, it is assumed that the client 10 corresponds to the server 20 by one to one and that the obtained values, the calculated values, the standby instruction, and the standby release are to be exchanged between the modules simply via the shared memory 24e. In general, however, as shown in FIG. 8, there can be a case where the server 20 receives requests from the clients $10_1$ to $10_n$ simultaneously. In this case, areas for the shared memory 24e corresponding to the clients $10_1$ to $10_n$ are prepared and the areas are previously associated with cookies. If processing is performed in response to a request from the client 10, the area of the shared memory 24e corresponding to the client 10 is used.

The shared memory 24e is only an example of the means for exchanging information between the modules. For example, an interprocess communication or any other means can be used for exchanging the information.

In this embodiment, the banner advertisement and the news article are transferred from the beginning of the phase 2 and the time $t_3$ is secured from the completion of transferring the banner advertisement to the completion of transferring the news article. This causes a user to be aware that the news article is still transferred though the transfer rate is decreased and yet does not cause a timeout advantageously due to the transfer method as stated above.

On the other hand, as an extreme example, there can be a case where the banner advertisement is transferred at the transfer rate acquired by the band check in the phase 1 and the news article is transferred over the time $t_3$ after the completion of the transfer. Only from the viewpoint of considering the time $t_3$ as a time period from the completion of transferring the banner advertisement to the completion of transferring the news article, the present invention can include the extreme case.

While the time period from the completion of transferring the banner advertisement to the completion of transferring the news article is controlled to be equal to the specified time $t_3$ in this embodiment, it can be controlled to be longer than or equal to the specified time $t_3$ to achieve the object of the present invention.

Figure 12:
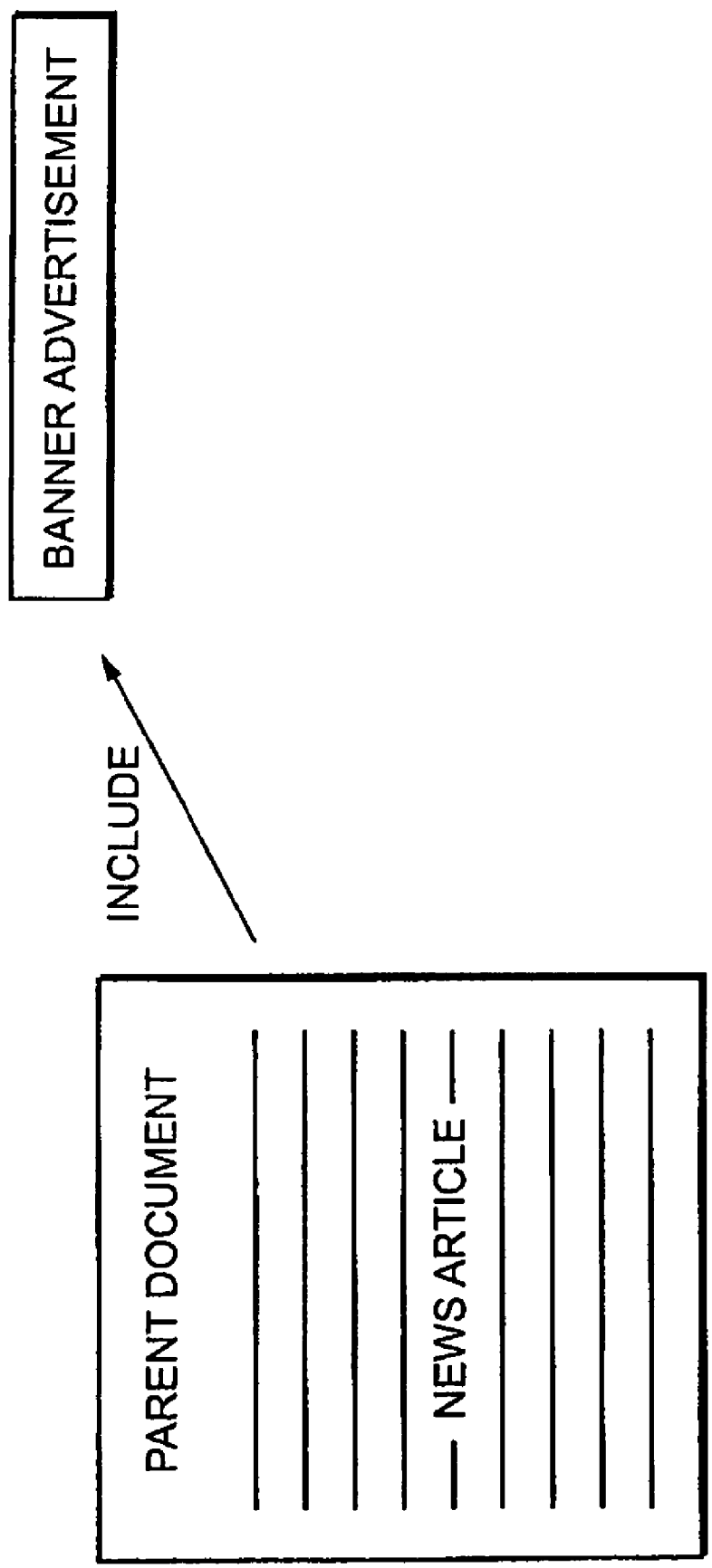
FIG. 12 is a diagram showing another configuration of the structured document treated in the embodiment of the present invention.

In this embodiment, as shown in FIG. 3, it is assumed that the parent document includes the banner advertisement and the news article. For example, however, as shown in FIG. 12, there can be a case where a parent document includes a news article, which further includes an advertisement. In this case, this embodiment can be applied by previously or dynamically converting it to the structure shown in FIG. 3.

Finally, a case where there are a plurality of banner advertisements or news articles will be described with reference to FIG. 13.

In this case, regarding the banner advertisements, the band check of the phase 1 is performed by using a banner advertisement having the maximum size and remaining small-size banner advertisements are transferred without the rate control. Regarding the plurality of news articles, the rate control is performed so that transfers of all the news articles are completed at the same time.

Referring to FIG. 13, there is shown a situation of transferring the banner advertisements and the news articles where the horizontal axis is a time axis similarly to FIG. 5. Each symbol over each arrow indicates an amount of transferred data of the banner advertisement or the news article in the corresponding phase and each symbol under each arrow indicates a transfer rate of the banner advertisement or the news article in the corresponding phase.

In this condition, α can be obtained by calculating the equation 5 where $B_2$ is $(B_{A2}+B_{B2})$ and N is $(N_{C2}+N_{C3}+N_{D2}+N_{D3})$. Thereby, the transfer rate of the banner advertisements is $(1-\alpha)v_T$ and the transfer rate of the news articles is $\alpha v_T$.

The plurality of banner advertisements may be transferred at $(1-\alpha)v_T$ without the rate control. Regarding the news articles, the rate control is performed so that their transfers are completed at the same time after the time $t_3$ has elapsed since all the banner advertisements were displayed. Specifically, if a news article whose amount of data is $(N_{C2}+N_{C3})$ and a news article whose amount of data is $(N_{D2}+N_{D3})$ are transferred as shown in FIG. 13, the transfer rates of the news articles can be obtained by distributing $\alpha v_T$ in the ratio of $(N_{C2}+N_{C3}):(N_{D2}+N_{D3})$.

While the rate control is not performed for the banner advertisements here, the rate control for them may be performed to complete the transfers of all the banner advertisements at the same time. If so, the transfer rates of the banner advertisements can be obtained by distributing $(1-\alpha)v_T$ in the ratio of $B_{A2}:B_{B2}$ where $B_{A2}$ is the remaining size of the banner advertisement used for the band check and $B_{B2}$ is the size of other banner advertisements as shown in FIG. 13.

As set forth hereinabove, the time $t_3$ for showing the banner advertisement is set so as to obtain $\alpha$, which is a distribution ratio for distributing the band VT into the transfer rate of the banner advertisement and the transfer rate of the news article. This advantageously enables making adjustments for showing information having been downloaded and all been displayed to a user for a certain period of time, without being noticed by the user that the adjustments are performed and without a timeout.

What is claimed is:

1. A method of transferring a structured document including at least a first and a second document element from a first computer to a second computer via a communication line, comprising the steps of:
    said first computer receiving a request to send the structured document from said second computer;
    said first computer acquiring amounts of data of the first document element and the second document element;
    said first computer checking on a communication band in the communication line;
    the communication band is checked on by said first computer transferring a part of data of the first document element in said checking step;
    said first computer distributing the communication band in proportions calculated on the basis of the communication band, a specific period of time, and the amounts of data of the acquired first and second document elements, thereby determining a first transfer rate for the first document element and a second transfer rate for the second document element so that a period of time from a completion of transferring the first document element to a completion of transferring the second document element is equal to or longer than the specific period of time;
    a remaining amount of data acquired by subtracting the part of data from the total data of the first document element is used as the amount of data of the first document element for use by said first computer in calculating the proportions in said determination step; and
    simultaneously transferring from said first computer the first document element and the second document element until the completion of transferring the first document element, said first computer transferring the remaining amount of data of the first document element at the determined first transfer rate and the second document element at the determined second transfer rate to said second computer, the second transfer rate remaining unchanged until at least the completion of transferring the first document element in said determination step.

2. The method according to claim 1, wherein said transfer step is to transfer remaining data by said first computer of the first document element at the determined first transfer rate and the second document element at the determined second transfer rate.

3. The method according to claim 1, wherein the second transfer rate is changed to a third transfer rate by said first computer upon completing transfer of the first document element so that the second document element not transferred yet is transferred over the specific period of time or longer.

4. A method of using a computer network causing a first computer, which transfers a structured document including at least a first and a second document element to a second computer via a communication line, to execute the steps of:
    storing a specific period of time by said first computer for displaying only a first document element on the second computer before displaying the entire structured document into a memory;
    said first computer receiving a request to send the structured document from the second computer;
    said first computer acquiring amounts of data of the first document element and the second document element;
    said first computer checking on a communication band in the communication line;
    the communication band is checked on by said first computer transferring a part of data of the first document element in said checking step;
    said first computer distributing the communication band in proportions calculated on the basis of the communication band, the specific period of time, and the amounts of data of the acquired first and second document elements, thereby determining a first transfer rate of the first document element and a second transfer rate of the second document element so that a period of time from a completion of transferring the first document element to a completion of transferring the second document element is equal to or longer than the specific period of time;
    a remaining amount of data acquired by subtracting the part of data from the total data of the first document element is used as the amount of data of the first document element for use by said first computer in calculating the proportions in said determination step; and
    simultaneously transferring from said first computer the first document element and the second document element until the completion of transferring the first document element, said first computer transferring the remaining amount of data of the first document element at the determined first transfer rate and the second document element at the determined second transfer rate to the second computer, the second transfer rate remaining unchanged until at least the completion of transferring the first document element in said determination step.

5. The method according to claim 4, wherein said transfer step is to transfer remaining data by said first computer of the first document element and the second document element at the determined first and second transfer rates.

6. The method according to claim 4, wherein the second transfer rate is changed to a third transfer rate by said first computer upon completing transfer of the first document element so that the second document element not transferred yet is transferred over the specific period of time or longer at the completion of transferring the first document element in said determination step.

7. A method of downloading documents from a server to a client, the method comprising:
    acquiring a predefined display time for a commercial message;
    receiving from the client a request to download a structured document comprising a commercial message and target data;

beginning simultaneous downloading of the commercial message and the target data;

completing the simultaneous downloading of the commercial message to said client while continuing to download the target data;

displaying the commercial message while continuing to download the target data;

completing the downloading of the target data while the commercial message is being displayed;

wherein the commercial message is displayed for at least the predefined display time before the completing of the downloading of the target data.

8. The method of claim 7, further comprising:

checking an available communication band between the client and the server for downloading.

9. The method of claim 8, further comprising:

allocating the available communication band between the downloading of the commercial message and the downloading of the target data.

10. The method of claim 9, wherein the available communication band is allocated in order to complete the downloading of the commercial message by a time equal to at least the predefined display time before completing the downloading of the target data.

11. The method of claim 7, wherein the commercial message is downloaded at a first rate simultaneous to the target data being downloaded at a second rate.

12. The method of claim 11, wherein once the displaying of the commercial message begins the target data is downloaded at a third rate.

* * * * *